United States Patent [19]
Watanabe et al.

[11] Patent Number: 5,389,329
[45] Date of Patent: Feb. 14, 1995

[54] METHOD AND APPARATUS FOR MOLDING A MAGNETIC DISK CARTRIDGE SHUTTER

[75] Inventors: Seiichi Watanabe; Tadashi Irie, both of Kanagawa, Japan

[73] Assignee: Fuji Photo Film Co., Ltd., Kanagawa, Japan

[21] Appl. No.: 126,655

[22] Filed: Sep. 27, 1993

[30] Foreign Application Priority Data

Sep. 29, 1992 [JP] Japan .................................. 4-282248

[51] Int. Cl.⁶ ................................................ B29C 45/44
[52] U.S. Cl. ................................. 264/318; 425/577; 425/DIG. 58
[58] Field of Search ............... 425/577, DIG. 58, 168; 264/318

[56] References Cited

U.S. PATENT DOCUMENTS 3,843,088 10/1974 McLoughlin et al. ...... 425/DIG. 58
4,923,388 5/1990 Nakamura ........................ 425/577

FOREIGN PATENT DOCUMENTS 0201870 11/1986 European Pat. Off. .
0353000 1/1990 European Pat. Off. .
0448320 9/1991 European Pat. Off. .

*Primary Examiner*—Tim Heitbrink
*Attorney, Agent, or Firm*—Sughrue, Mion, Zinn, Macpeak & Seas; Richard C. Turner; Joseph Buczynski

[57] ABSTRACT

A molding method and a mold for molding a plastic shutter, wherein a plate-like member with a free end is extended into a molding cavity to define an injection together with at least two opposed planar plates. A thrust member, which is movable in the direction of thickness of the plate-like member and which applies a thrust force to the plate-like member, is provided close to the free end of the plate-like member. In a state where the amount of movement of the thrust member is adjusted to within a predetermined range as viewed in the thickness direction of the plate-like member, on the basis of the position where the forward end of the thrust means comes in contact with the plate-like member, molten resin is injected into the injection space, thereby forming the plastic shutter.

29 Claims, 9 Drawing Sheets

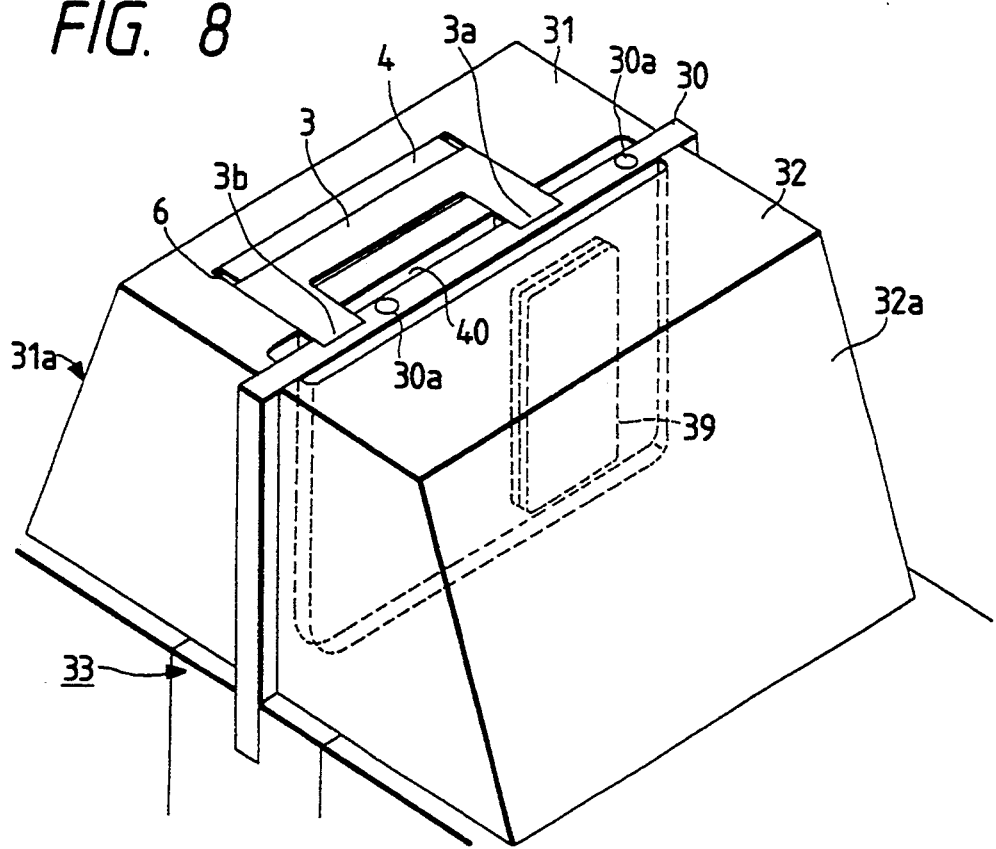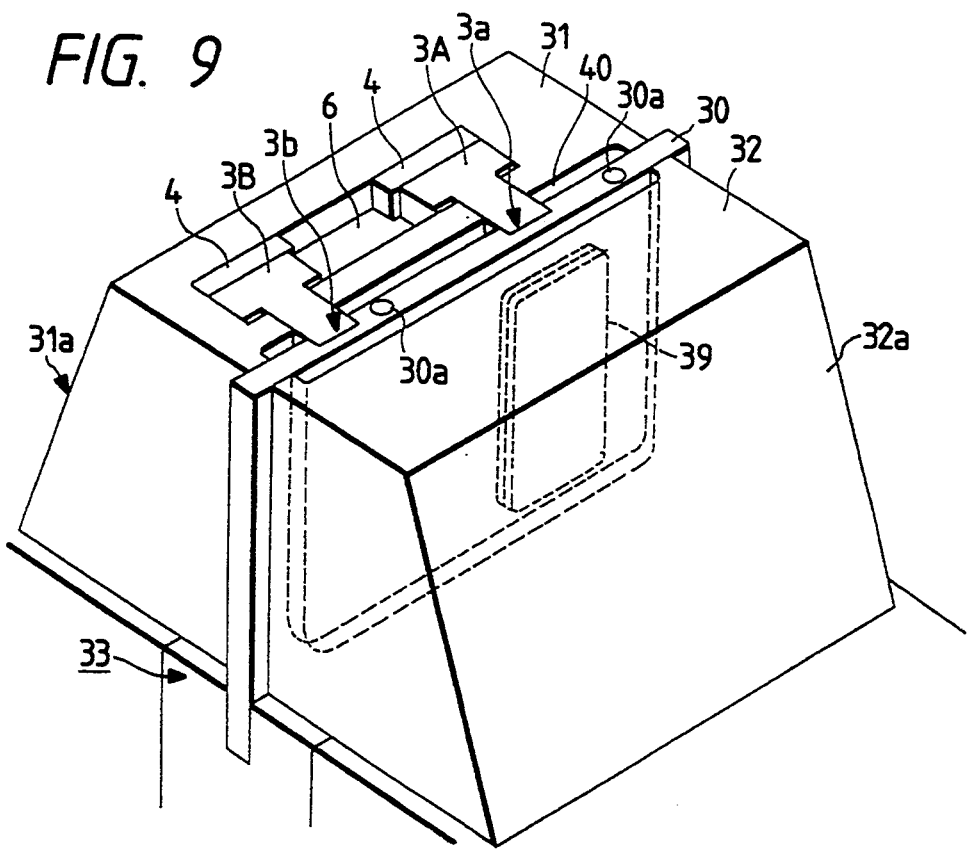

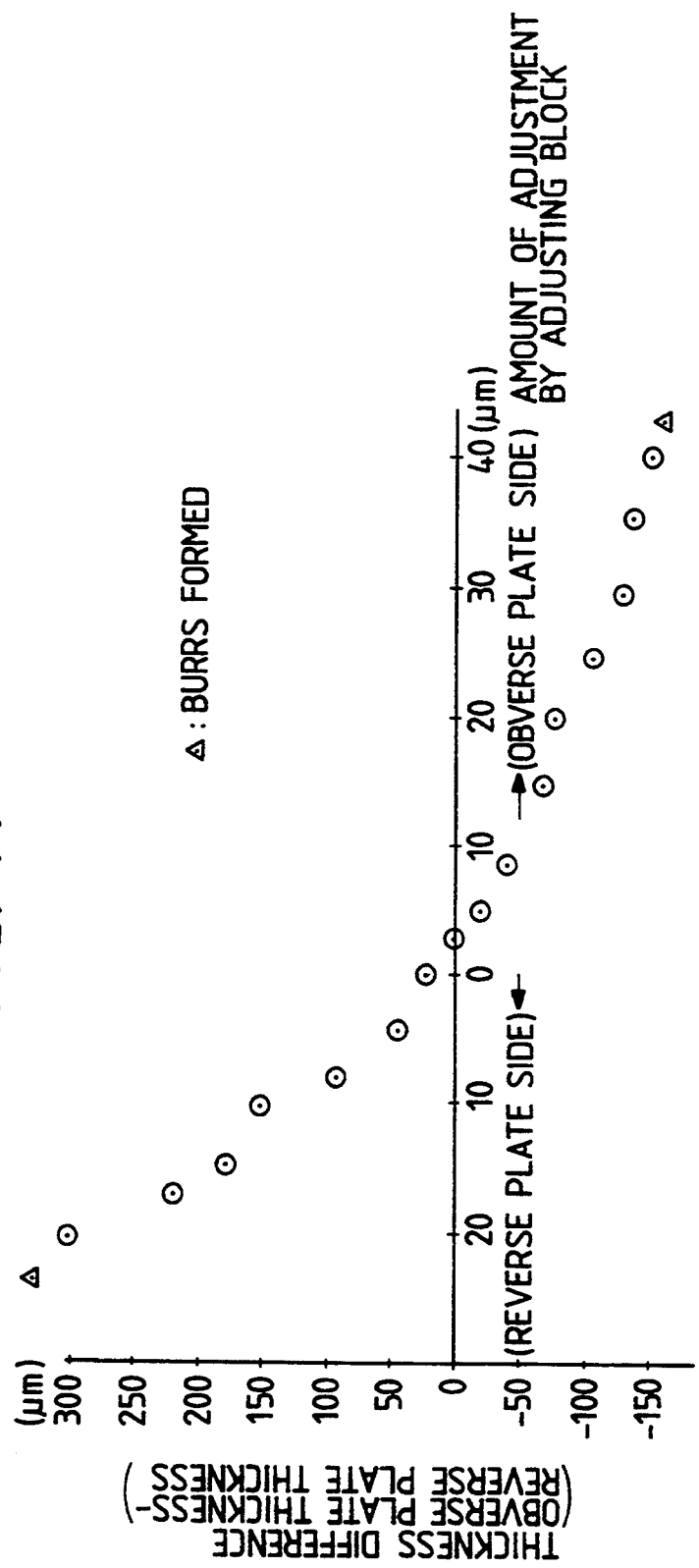

METHOD AND APPARATUS FOR MOLDING A MAGNETIC DISK CARTRIDGE SHUTTER

BACKGROUND OF THE INVENTION

The present invention relates to a plastic shutter having at least two relatively thin face plates opposed to each other, a method for molding the plastic shutter, and a mold using the method. More particularly, the invention relates to a plastic shutter mounted on a cartridge case which accommodates a disc-like recording medium, specifically, a method for molding the plastic shutter and a mold for molding the plastic shutter.

With the advancement of plastic molding technology, plastic products have gradually superseded products formed of other materials.

A shutter of a disc cartridge is a typical example of a product which is now often made of plastic instead of another material (metal in this instance). Plastic shutters are disclosed in Published Unexamined Japanese Patent Application No. Sho. 60-231985, Published Unexamined Japanese Patent Applications Nos. Hei. 2-199685, 2-230580, 2-229019, 3-22276, 3-369077, and Published Unexamined Japanese Utility Model Applications Nos. Hei. 1-116620 and 3-81717. In such techniques, synthetic resin is molded to form the shutters for disc cartridges, which shutters were previously formed of thin metal plates, such as stainless steel plates. The manufacturing process (injection molding) used to produce resin shutters is simple compared with techniques used to produce metal shutters, and further is inexpensive to implement. That is, metal shutters require many manufacturing steps, such as bending and cutting steps, and require a high working accuracy.

A disc cartridge with which a plastic shutter is currently widely used is a 3.5-inch "microfloppy" disc cartridge constructed as shown in FIG. 11. In this microfloppy disc cartridge, designated by reference numeral 21, a magnetic disc 15 is rotatably disposed between rectangular upper and lower half shells 12 and 13 made of ABS resin, for example. The magnetic disc 15 is fixed to a disc center core 14. An opening 17 is formed in the central part of the lower half shell 13 of the cartridge 21. A rotary motor shaft engages the disc center core 14 through the opening 17.

A magnetic head insertion opening 18 is formed in both the upper and lower half shells. Through the opening 18, a magnetic head and a head pad move toward and away from the magnetic disc 15 for writing data signals into the magnetic disc 15 and for reading the same from the disc.

The microfloppy disc cartridge 21 further includes the above-mentioned shutter, designated by reference numeral 22. The shutter 22, which acts as an opening/-closing member, is slidable to open and close the magnetic head insertion opening 18 for preventing dust from entering the microfloppy disc cartridge 21 through the opening 18 and attaching to the magnetic disc 15.

The shutter 22 is shaped like a U in longitudinal section. The shutter 22 is mounted so as to be slidable in the directions of opening and closing the magnetic head insertion opening 18 by a piece protruding toward the inner side of the shutter 22 and which is guided along a guide groove formed along the edge of the front end of the lower half shell 13. The shutter 22 slides with a slide area 11 including the circumferential edge of the magnetic head insertion opening 18 and reaching one side of the magnetic disc.

The structure of a mold for molding synthetic resin into such a shutter is constructed as shown in FIG. 12. As seen in this figure, slide cores 31 and 32 are disposed above and below (or on the right and left sides of) a plate-like member 30 located at the center. FIG. 12 is a longitudinal sectional view of the mold taken on a line D—D in FIG. 11.

An injection space 40 for shaping the shutter 22 is defined by the plate-like member 30, the slide cores 31 and 32, and the upper fixed mold 34. A portion of the shutter blank corresponding to the opening window 23 is formed by protruding portions of the slide cores 31 and 32.

Molten resin is injected into the injection space 40 through a gate 35 in the upper fixed mold 34. After the injected resin has properly hardened, the slide cores 31 and 32 are slid apart from the plate-like member 30 (in the directions of arrows C and D). Thereafter, the thus-molded shutter 22 is pushed outward by thrust pins provided in the plate-like member 30, separated from the plate-like member 30, and extracted from the mold.

The shutter 22 is thin, having a thickness of approximately 300 $\mu$m to 400 $\mu$m. The injection space 40 is thus an extremely small gap. Therefore, an extremely high injection pressure of 1000 kg/cm$^2$ to 2000 kg/cm$^2$ must be applied to the resin when it is injected into the injection space 40. The plate-like member 30 is a thin plate-like core having a thickness of approximately 2.3 mm to 3.0 mm. Therefore, if the plate-like member 30 receives a nonuniform resin injection pressure, it will be deflected.

The nonuniformity of the injection pressure can be due to the following reason (although it depends on the position of the gate 35 and the state of the flow of the injection resin). In the case of a mold having the gate 35 located in the upper part, a projection 44 as shown in FIG. 12, a projection 44 for forming a protruding piece 24 of the shutter 22 extends toward the plate-like member 30. Due to presence of the projection 44, the rate of flow (X) of the molten resin flowing through the channel having the projection 44 is smaller than the rate of flow (Y) of the molten resin flowing through the channel not having the projection 44. The flow rate difference causes the nonuniformity of the resin pressure.

Due to the nonuniform resin pressure, the shutter is convexly curved to the right side as shown in FIG. 12. When the deflection of the shutter is great, the plate-like member 30 deforms the gap of the injection space 40. Concerning the molding accuracy of the mold, if the gap difference of the injection space 40 is about 1 $\mu$m, a pressure difference of about 1% will be induced. The plate-like member 30 is deflected to the length of about 50 $\mu$m. The deflection causes a thickness difference between the right and left portions of the shutter in the injection space 40, and further makes nonuniform the thickness of each of the right and left portions of the shutter. To cope with this, the molding accuracy of the mold must be within ±0.1 $\mu$m. It is difficult to attain this accuracy, and it is substantially impossible to maintain such accuracy during use of the mold.

Also with respect to the assembling accuracy of the mold, the dimensional differences caused within the injection space 40 result in a similar deformation of the mold. With the present state of molding technology, it is very difficult to reproduce the injection spaces 40 accurately by combining molds as described above at the accuracy of ±1 μm or less.

When a thin member, such as the shutter 22, has a nonuniform thickness, the cooling velocity of the resin is also nonuniform, resulting in deflection of the shutter 22. The shutter, when deflected, can slide interruptively, and more adversely can damage the magnetic disc cartridge to an extent that the cartridge cannot be used. In the injection mode illustrated in FIG. 12, if the pressure difference of the injection pressure exceeds 3%, there is a danger that the plate-like member 30 will be destroyed.

For the above reasons, it is very important that the rein pressure of the resin injected into the injection space 40 of the mold be uniformly applied to both side walls of the plate-like member 30.

Presently, the following general methods of manufacturing the mold are available. In the first method, a mold is first manufactured and used to manufacture a shutter in a test run. The thickness of the side plates of the shutter molded by the mold is measured. Depending on the results of the measurement, the mold wall defining the injection space 40 is adjusted by cutting, for example. In another method, a mold is first manufactured as in the first method. The thickness of the side plates of the shutter molded by the mold is measured. Depending on the results of this measurement, a gas vent, provided for releasing gas within the injection space 40 when the resin is injected, is adjusted.

In these methods, after the mold is manufactured, the molding test is repeated for adjusting the dimensions of the mold or setting optimum values of the assembling positions. However, with these techniques it takes a long time before mass production of the shutters can begin, increasing the effective cost of the molds. Further, in the conventional methods, when, for example, the mold is disassembled for maintenance and assembled again, it is very difficult to set the assembly positions to the positions previously accurately set.

SUMMARY OF THE INVENTION

Accordingly, an object of the present invention is to provide a mold for molding a plastic shutter constructed so that the thickness of the molded product is constant, irrespective of any deflection of the plate-like member.

Another object of the present invention is to provide a molding method with which to mold a plastic shutter having less nonuniformity of thickness, requiring no adjustment involving cutting the mold, and with which the molding process can enter the mass production stage quickly.

An additional object of the present invention is to provide a long-life mold which enables the molding process to quickly shift to the mass production stage without adjustment involving cutting the mold and without causing fatigue in the plate-like member.

The above and other objects of the present invention can be achieved by a method for molding a plastic shutter in which a plate-like member with a free end is extended to define an injection space defined by at least two opposed continuous planar plates, and resin is injected from a region closer to the free end, wherein thrust means movable in the direction of the thickness of the plate-like member when molten resin is injected into the injection space is provided close to the free end of the plate-like member, and in a state wherein a quantity of movement adjustment of the thrust means is within a range between a point +40 μm to the side to which the plate-like member is thrust and another point −20 μm to the opposite side viewed in the direction of the thickness of the plate-like member, on the basis of the position where the forward end of the thrust means contacts the plate-like member, molten resin is injected into the injection space, thereby forming the plastic shutter.

The objects of the present invention can further be achieved by a mold having an injection space defined by at least two opposed continuous planar plates, and a gate for molding disposed in the region where the two planar plates are continuously joined, wherein a plate-like member defining the inner surface of the injection space is provided, wherein at least one thrust means to be brought into contact with the plate-like member and being movable in the direction of the thickness of the plate-like member is provided, and the range of adjustment of the thrust member is within a range between a point +40 μm to the side to which the plate-like member is thrust and another point −20 μm to the opposite side viewed in the direction of thickness of the plate-like member, on the basis of the position where the forward end of the thrust means contacts the plate-like member.

The objects of the present invention can also be achieved by a method for molding plastic shutters in which an injection molding process is performed in a state wherein the plate-like member is deflected by the thrust means, and a gap allowing the plate-like member to be deflected in the direction of the thickness of the plate-like member is provided between the plate-like member and raised portions formed on the walls confronting with the plate-like member in order to form a head insertion window in a plastic shutter.

The objects of the present invention can further be achieved by a mold for molding plasmic shutters in which a plural number of thrust members are provided in a receiving portion of the mold in an independently movable manner, or a mold in which a thrust member having two forward end parts is movably provided in a receiving portion of the mold in a state such that the thrust member is allowed to contact the plate-like member, or a mold in which the rear end face of the thrust member is slanted, a wedge-like adjusting block shaped in conformity with the slanted rear end face is movably provided, and the quantity of movement of the thrust member is adjusted by moving the adjusting block in a direction substantially orthogonal to the moving direction of the thrust member.

BRIEF DESCRIPTION OF THE DRAWINGS

FIG. 8 is a perspective view showing a key portion of a mold according to another embodiment of the invention;

FIG. 9 is a perspective view showing a key portion of yet another mold according to another embodiment of the invention;

FIG. 14 is a graph showing the relationship of the thickness difference between the obverse and reverse plates of a shutter versus the amount of adjustment by an adjusting block when the forward ends of thrust members are adjusted.

DESCRIPTION OF THE PREFERRED EMBODIMENTS

Preferred embodiments of the present invention will now be described with reference to the accompanying drawings.

Figure 1:
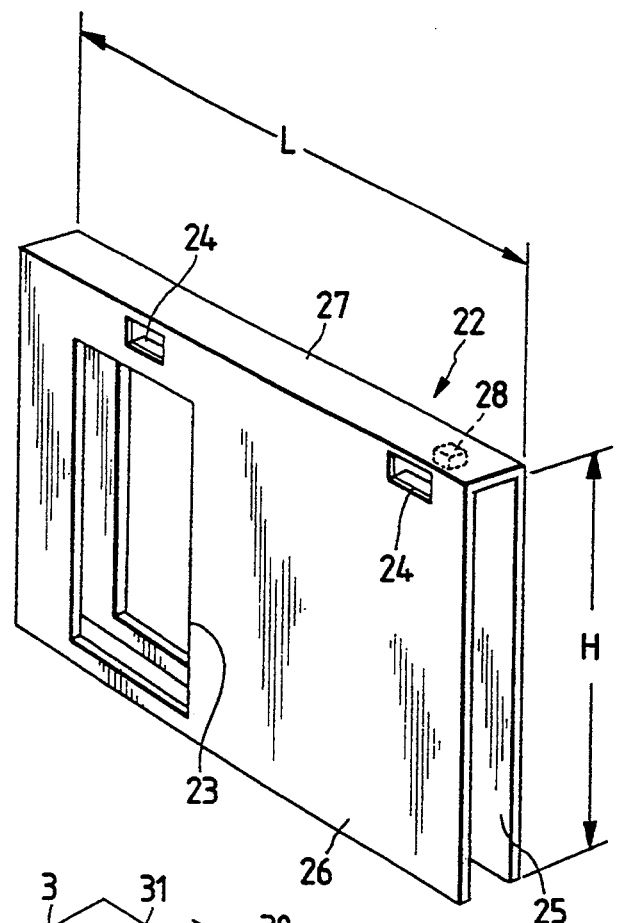
FIG. 1 is a perspective view showing a 3.5-inch microfloppy disc cartridge molded by a molding apparatus of the present invention.
Figure 2:
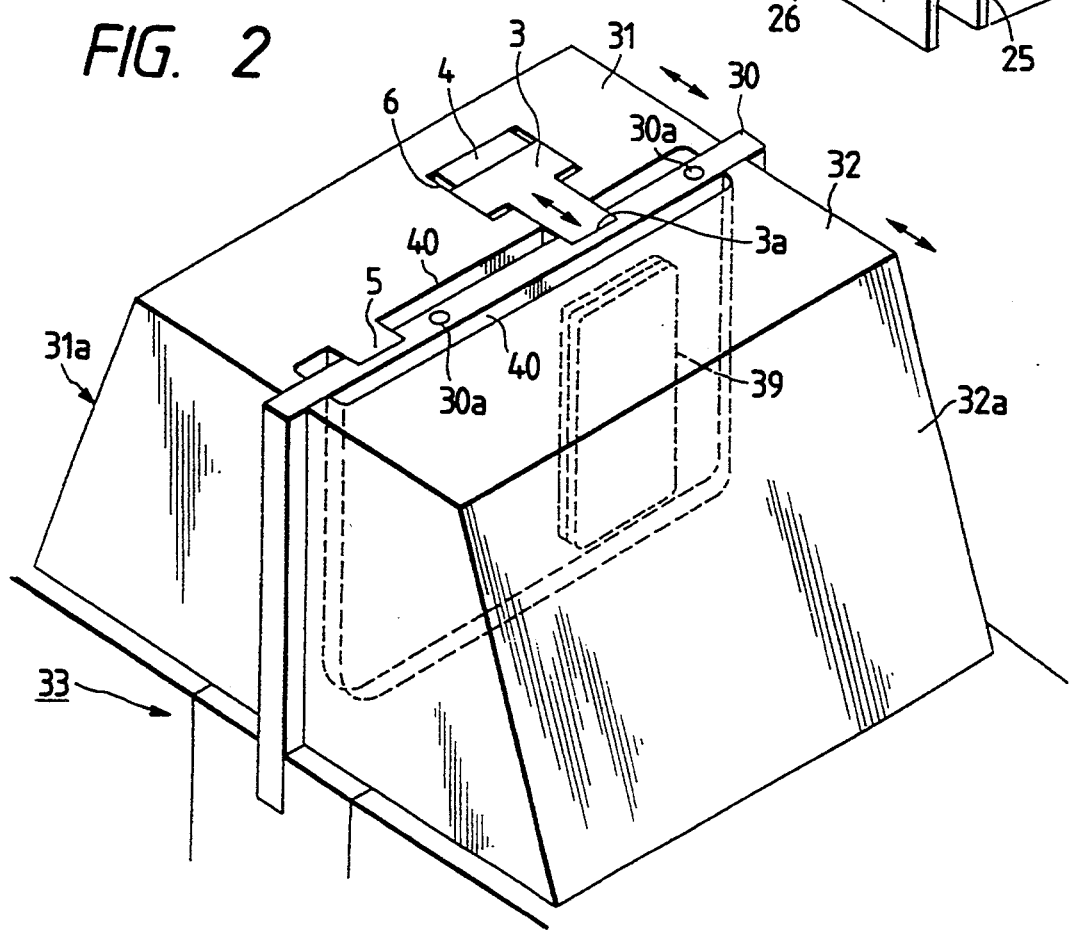
FIG. 2 is a perspective view showing slide cores and a plate-like member provided in the movable mold of a mold according to the invention.
Figure 3:
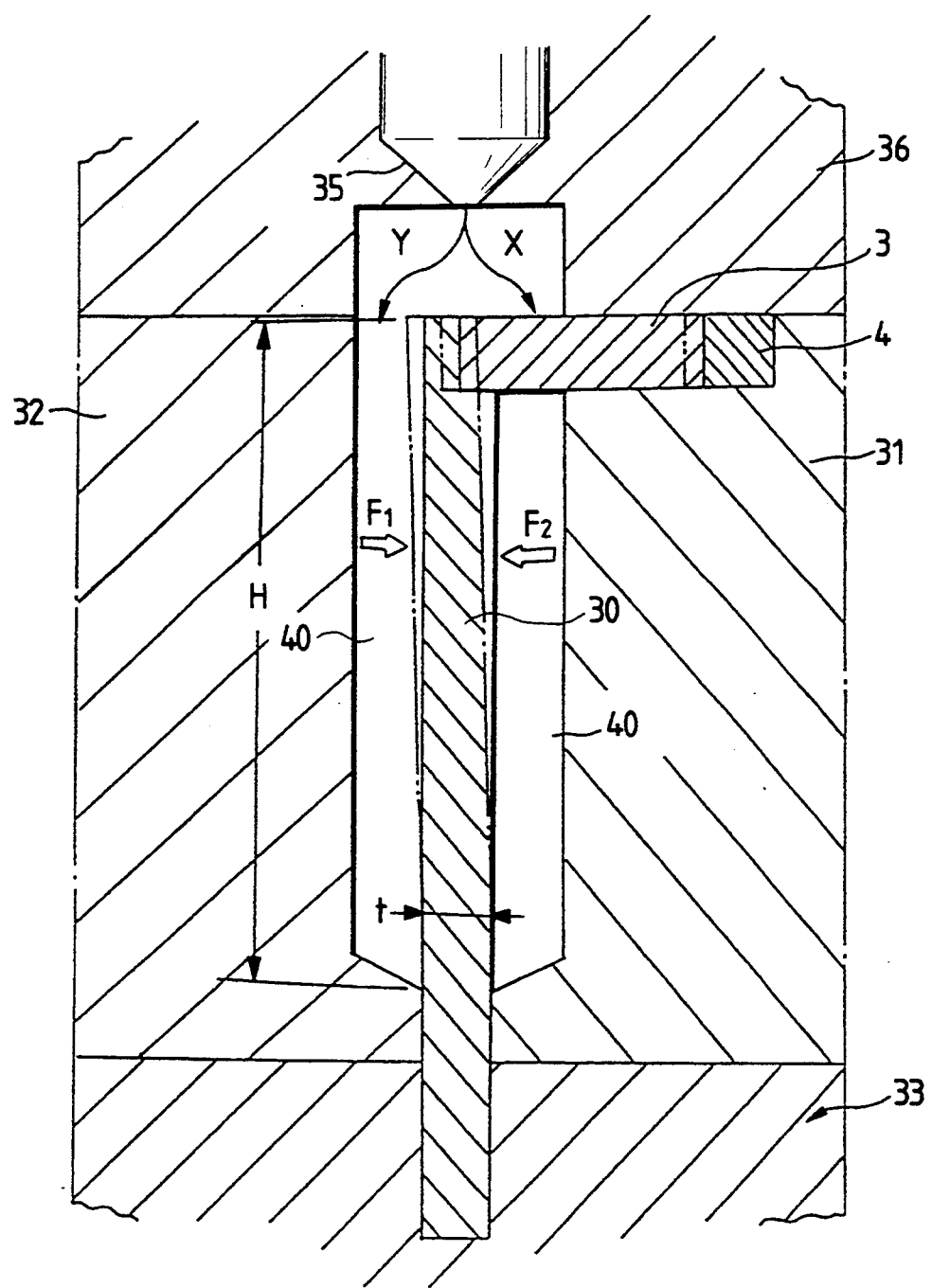
FIG. 3 is a longitudinal sectional view showing a key portion including an injection space and nearby portions of an assembled mold according to a previous embodiment of the present invention.
Figure 4:
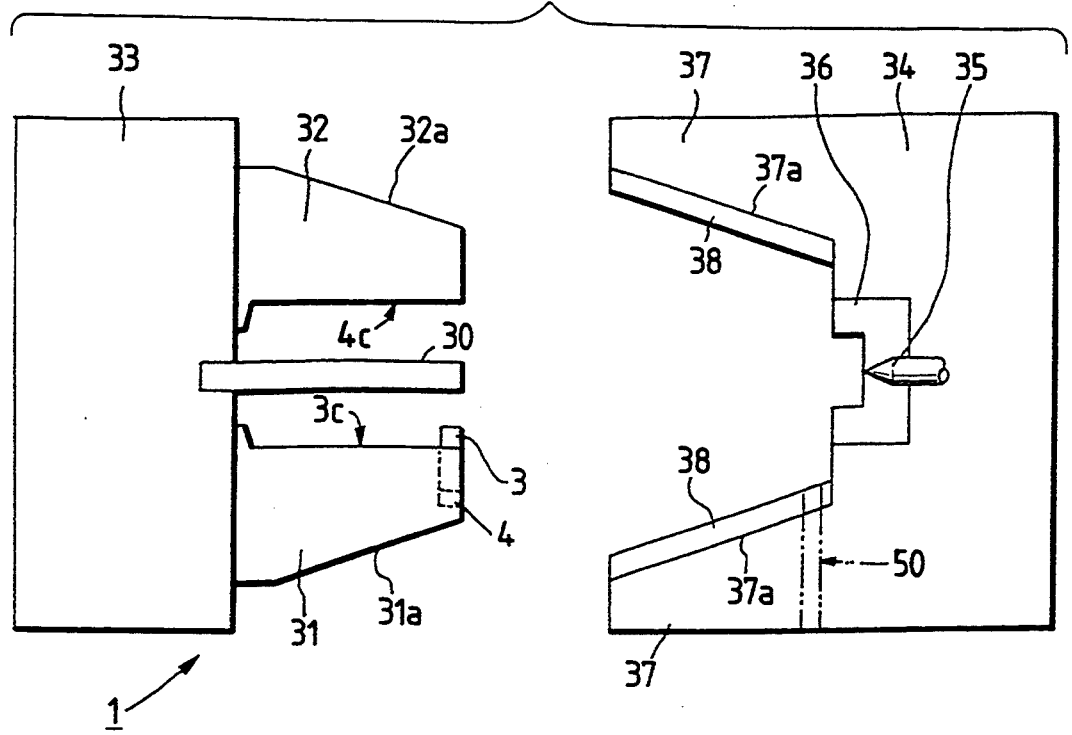
FIG. 4 is a schematic view illustrating a process for assembling a mold according to an embodiment of the present invention.
Figure 5:
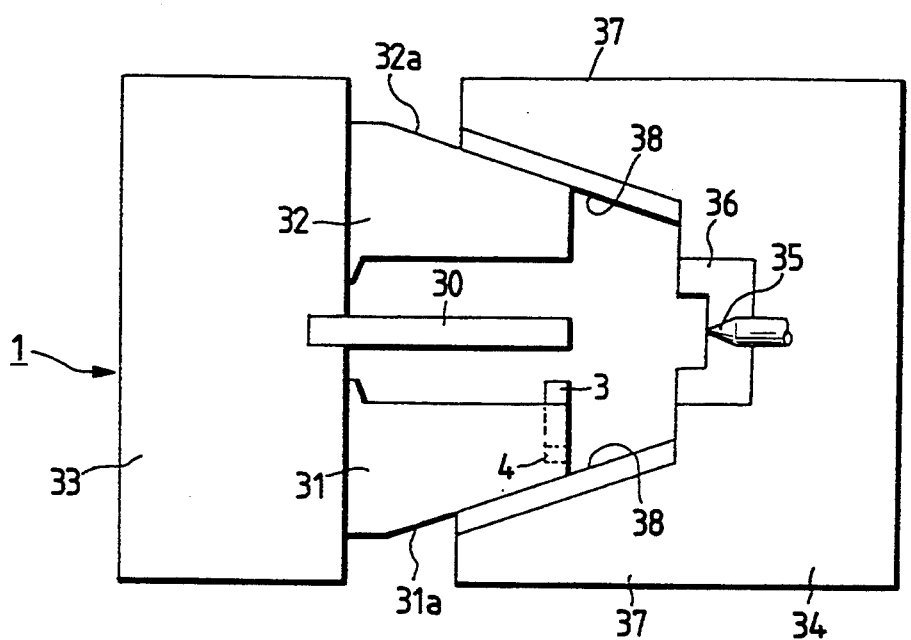
FIG. 5 is a schematic view illustrating a process for assembling a mold according to an embodiment of the present invention.
Figure 6:
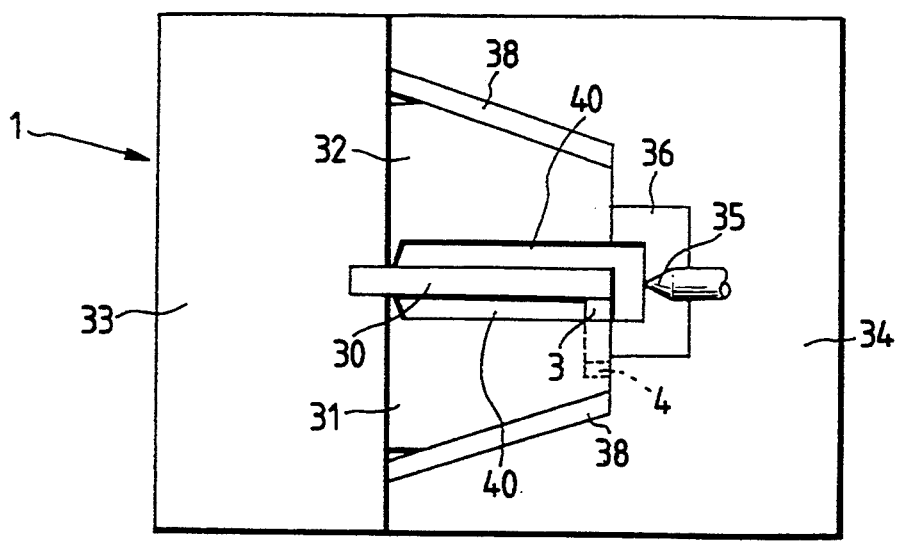
FIG. 6 is a schematic view showing a process for assembling a mold according to an embodiment of the present invention.
Figure 11:
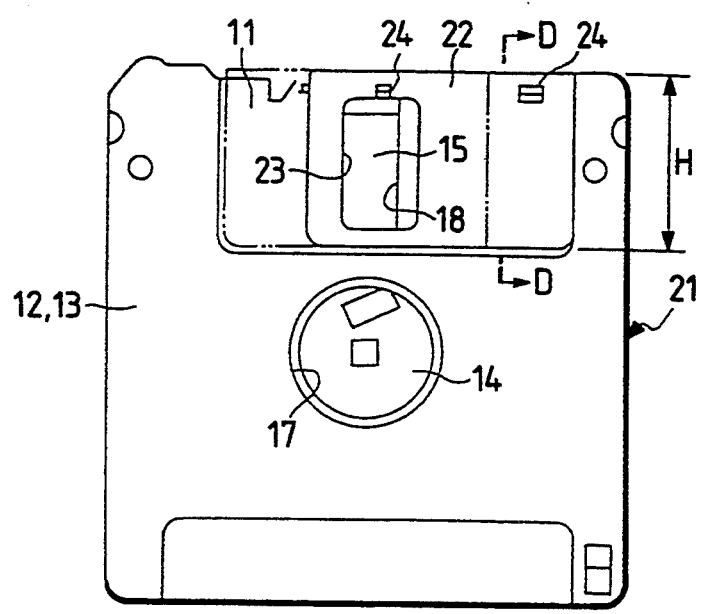
FIG. 11 is a plan view showing a 3.5 inch microfloppy disc cartridge.
Figure 12:
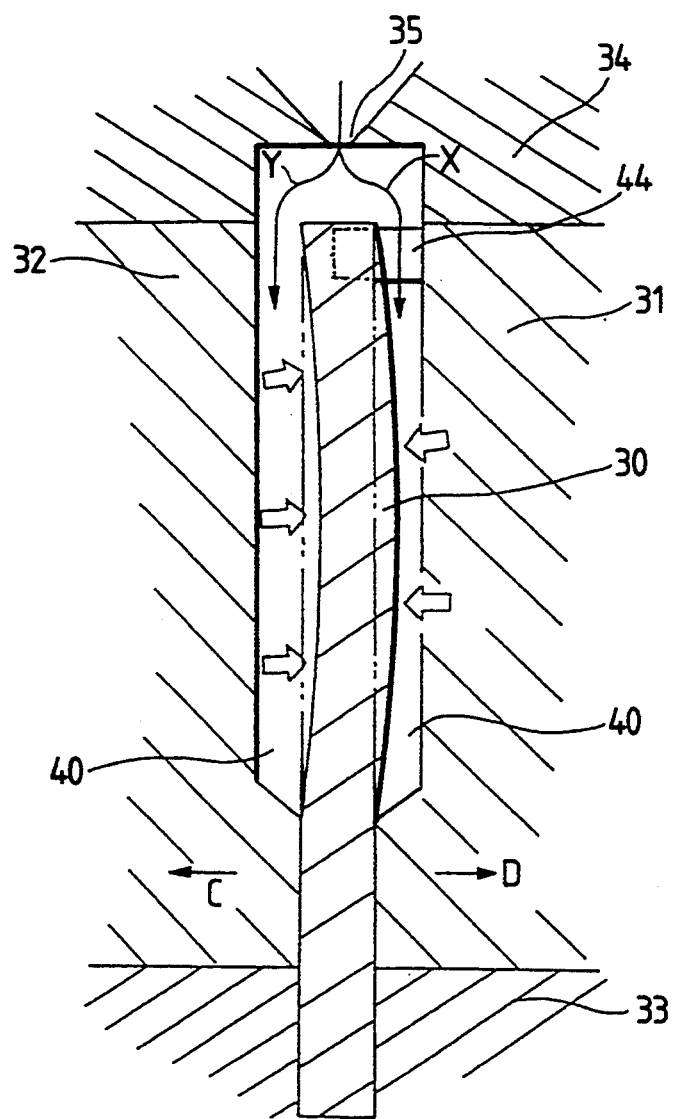
FIG. 12 is a longitudinal sectional view showing a conventional mold for molding the shutter of the cartridge shown in FIG. 11.

FIG. 1 shows a molded product according to an embodiment of the present invention. The molded product is a shutter similar to the shutter 22 of the 3.5 inch microfloppy disc cartridge shown in FIG. 11. FIG. 2 is a perspective view showing slide cores and a plate-like member, which are provided in the movable mold. FIG. 3 is a longitudinal sectional view showing a key portion including an injection space and nearby portions of an assembled mold. FIGS. 4 through 6 schematically illustrate sequential steps for assembling a mold according to an embodiment of the present invention.

In FIG. 1, the plastic shutter 22, shaped like a U in cross section, is composed of an obverse plate 25, a reverse plate 26, and a top plate 27 coupling the obverse plate 25 and the reverse plate 26. Windows 23 are formed in the obverse and reverse plates 25 and 26 at locations offset from the centers thereof. A protruding piece 24, which engages a groove of the cartridge shell, protrudes from the location of the reverse plate 26, which is closer to the top plate 27. Another protruding piece 28 protrudes from the top plate 27 toward the inside thereof (in the figure, it protrudes downward). The protruding piece 28 engages and fixes a spring for urging the shutter in its closing direction. The distance between the distal ends of the plates 25 and 26 is shorter than the width of the top plate 27.

The shutter 22 is made of resin of a high mechanical strength, for example, polyoxymethylene. The shutter, when mounted on the cartridge shell, nips the cartridge shell with an appropriate pressure in a state so that the shutter is slidable to open and close the opening of the cartridge shell.

The shutter 22 is formed by injecting resin into a molding space in a such manner that a plate-like member 30 (see FIG. 2), which extends at the center between the right and left slide cores for partitioning the molding space, is biased at the top end toward the obverse plate 25.

Accordingly, when the plates 25 and 26 are being formed under molding process, the resin injection pressure is uniform. Deflection of the plate-like member 30 by the injection pressure is not great, thus providing an extremely small thickness error. As a result, the shutter 22 has a uniform thickness, and the degree of filling of resin is uniform. Following injection, the resin is cooled at a uniform rate. The molded product is dimensionally accurate with a less distortion and deformation.

To open the mold, slide cores 31 and 32 shown in FIG. 2 are arranged such that the cores, which nip the plate-like member 30, move to approach each other and depart one from the other on the movable mold substrate.

The slide core 31 is provided with a fixed, protruding part 5 which protrudes into the injection space 40 and a movable thrust member 3. The thrust member 3 includes a forward end 3a and a wide rear part. The rear part is slidably received in a depressed portion 6. The amount of protrusion of the forward end 3a of the thrust member 3 is adjustable depending on the size of an adjusting block 4. Raised portions 39 for forming the windows, which are respectively formed in the slide cores 31 and 32, are located opposite one another. Surfaces 31a and 32a of the slide cores 31 and 32 are slanted so that the end faces of the slide cores, which are to face a fixed mold 34, are small.

The protruding part 5 is used for forming the protruding piece 28 for fixing the spring and the protruding piece 24 shown in FIG. 1. The forward end 3a of the thrust member 3 is used for forming another protruding piece 24.

The fixed mold 34 includes extended portions 37, which cooperate to form an inwardly curved portion for receiving the slide cores 31 and 32 and the plate-like member 30. The opposed inner sides of the inwardly curved portion form slanting surfaces 37a, which correspond to the slanting surfaces 31a and 32a. Space blocks 38 for space adjustment are provided on the respective slanting surfaces 37a.

In the adjustment of the amount of protrusion of the thrust member 3, the thrust member 3 cannot perform the desired function if the raised portions 39 for window formation completely fixes the plate-like member 30. To avoid this problem, a proper gap must be provided between the raised portions 39 and the plate-like member 30. However, if the gap is large, the injected resin will enter the gap and form burrs. For this reason, the width of the gap is preferably within 3 to 15 μm, more preferably 5 to 8 μm. The gap when set to 5 to 8 μm provides an effective adjustment.

The adjusting block 4 assembled into the rear side of the thrust member 3 is adjusted on the basis of T (μm), which is the value of the thickness thereof at which the forward end 3a of the thrust member contacts the plate-like member 30, without pressing the latter, when the mold is closed. The range of the adjustment may be set within a proper range from a value greater than T to a value less than T (T+40 μm to T−20 μm). The range may be selected to be within +300 μm to −150 μm as the thickness difference between the obverse plate 25 and the reverse plate 26 (the difference when the thickness of the reverse plate is subtracted from that of the obverse plate). The preferable range of adjustment by the adjusting block is between T+20 μm and T−10 μm, and the preferable thickness difference between the plates 25 and 26 is between +150 μm and −75 μm (the difference when the thickness of the reverse plate is subtracted from that of the obverse plate).

A plural number of adjusting blocks 4, which can adjust the thickness difference within the preferred range by respective different amounts, are prepared. From those adjusting blocks 4, a block of a desired thickness is selected and set in the mold. For about 300 μm to 400 μm of the range of the thickness of the plates 25 and 26, the dimensions of the plate-like member 30 are 2.96 mm in thickness t, 47.5 mm in length L of the injection space, and 31.5 mm in height H.

The adjusting blocks 4 are not limited to a specific number, but if a suitable number of adjusting blocks 4 of thickness 10 μm, 1 μm, 0.5 μm, and 0.1 μm, for example, are prepared, the adjustment can be carried out quickly and accurately.

For about 300 μm to 400 μm of the range of the thickness of the plates 25 and 26, the amount of adjustment by the adjusting block 4 may be any value obtained by dividing the difference in thickness between the plates 25 and 26 by a factor of 10 to 3.

Figure 7:
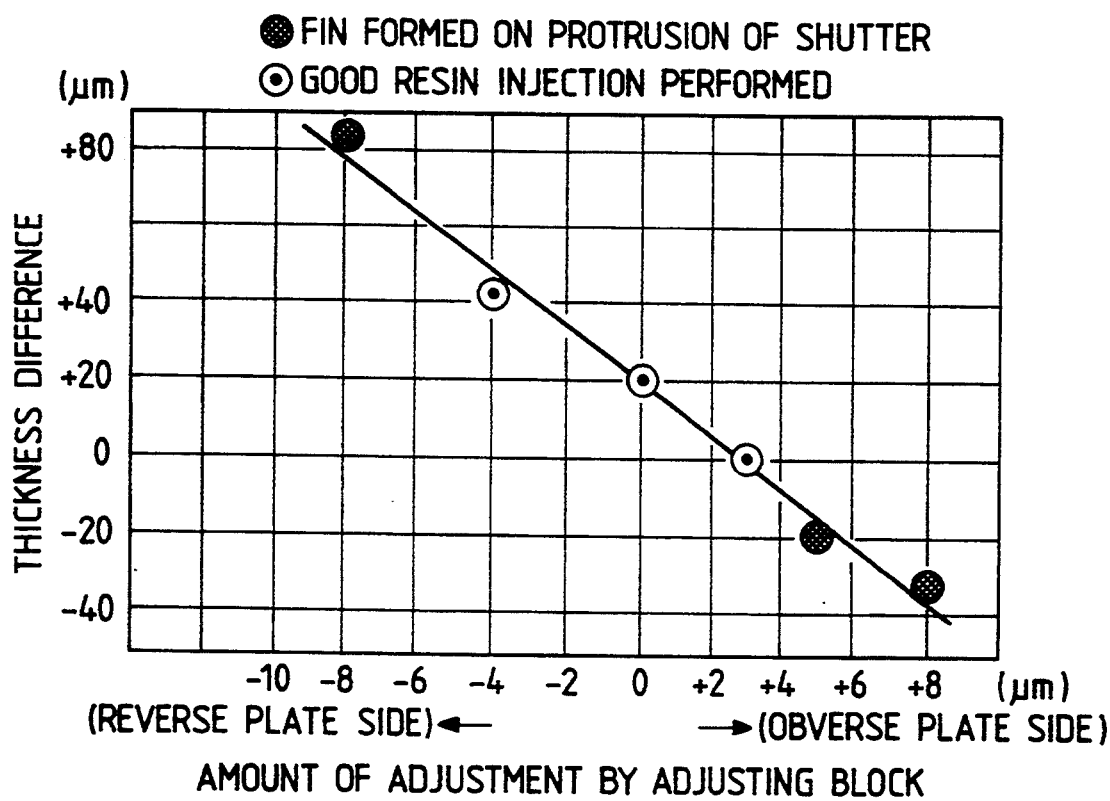
FIG. 7 is a graph showing a relationship of a thickness difference between the obverse and reverse plates versus a quantity of adjustment by an adjusting block.
Figure 13:
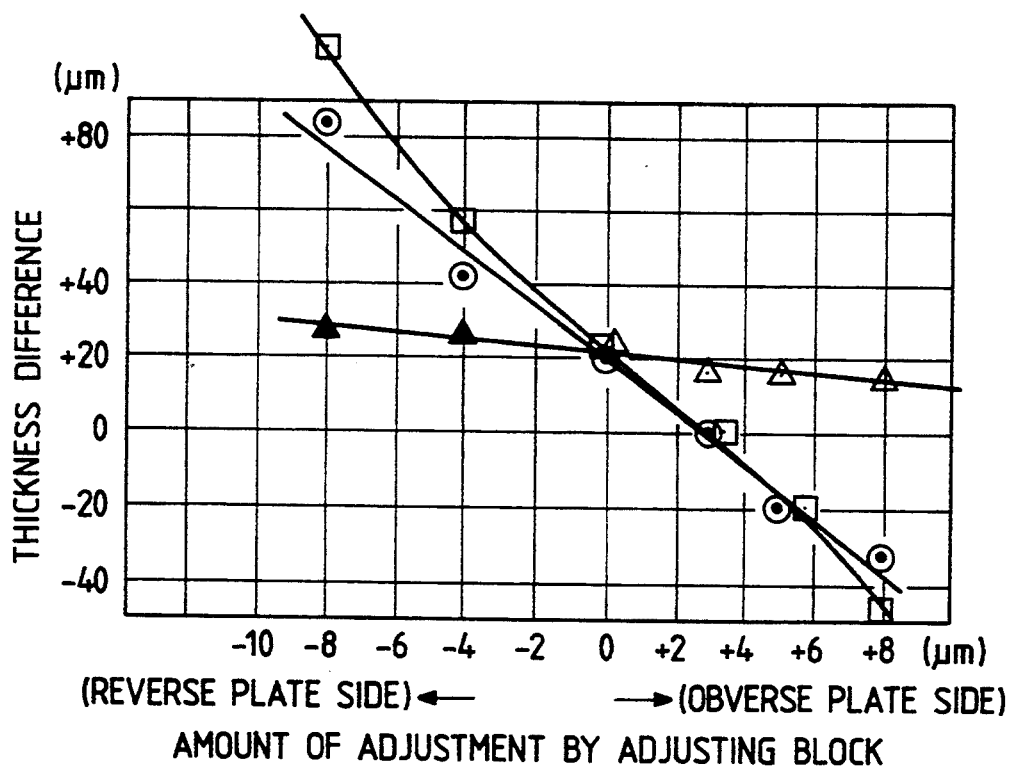
FIG. 13 is a graph showing results of measurements for different gaps between raised portions for forming magnetic-head insertion windows and a plate-like member.

The results of the preliminary tests conducted before the stage of producing the shutters 22 of this embodiment in mass are graphically shown in FIGS. 7, 13 and 14.

The graph of FIG. 7 shows the relationship of the thickness difference between the obverse and reverse plates versus the amount of adjustment by the adjusting block 4 when only the adjusting block 4 for the thrust member 3A is changed for adjustment, while the amount of protrusion of the thrust member 3B was kept constant.

As seen from the graph, the adjustment yields good injection conditions when the adjustment by the adjusting block 4 is within the range of approximately +4 μm to −4 μm. When the adjusting block 4 for the thrust member 3A is changed such that formation of burrs on the protruding piece 28 starts, the formation of burrs can be prevented by adjusting another adjusting block 4 (for the thrust member 3B). The graph further teaches that only 3 μm of movement of the plate-like member 30 produces as large as 20 μm of thickness difference between the obverse and reverse plates 25 and 26. This implies that where the thickness difference between the obverse and reverse plates 25 and 26 is 10 μm, simply changing the depth of the mold by cutting from 3 μm to 1.5 μm (half of that according to the conventional adjusting method) provides insufficient adjustment.

The graph of FIG. 13 shows results of measurements for different values of the gap between the raised portions 39 provided for forming the magnetic-head insertion windows 23 and the plate-like member 30. As seen from FIG. 13, for a gap of 20 μm, burrs were formed on the windows 23. For a gap of 0 μm, adjustment of the thickness difference between the obverse and reverse plates could not be carried out, and burrs were formed on the protruding piece 28 for relatively small amounts of adjustment of the adjusting block 4. For a gap of 8 μm, adjustment by the adjusting block 4 could be carried out over a broad range in a burr-free state.

FIG. 14 is a graph showing the relationship of the thickness difference between the obverse and reverse plates versus the amount of adjustment by the adjusting block when the forward ends 3a and 3b of the thrust members are adjusted.

As seen from the graph, the thickness difference between the obverse and reverse plates 25 and 26 could be adjusted within the range from +300 μm to −150 μm for the range of approximately +40 μm to −20 μm of adjustment by the adjusting block 4. Preferably, the thickness difference ranges from +150 μm to −75 μm for the adjustment range from T+20 μm to T−10 μm. Thus, the range of adjustment by the adjusting block 4 was considerably broad.

The graphs also teach that when the adjustment quantity of the adjusting block 4 exceeds +40 μm, the lifetime of the mold is shortened, and when it is below −30 μm, problems arise in the product quality of the shutter (burrs are formed). From this fact, it was confirmed that an adjustment of +40 μm in the direction of pushing the plate-like member 30 a distance of −20 μm in the direction opposite to the former was effective. Further, it was confirmed that when the adjustment was set within +20 μm to −10 μm in consideration of the lifetime of the mold, the quality of the products could be kept good and problems in the mold, such as damage to the plate-like member 30, were not found after 2,000,000 shots or more.

When the movable mold 33 and the fixed mold 34 are separated from each other as shown in FIG. 4, the slide cores 31 and 32 are also horizontally (vertically in the drawing) separated from each other in a state such that the cores confront each other and the plate-like member 30 is located at a mid point between them. When the movable mold 33 is moved (advanced) toward the fixed mold 34, the slanting surfaces 31a and 32a of the slide cores 31 and 32 advance while in contact with the space blocks 38 on the respective extended portions 37 so that the slide cores approach each other, and finally the cores come into contact with the plate-like member 30 and also with a top-plate forming portion 36 provided with the gate 35.

In forming the shutter 22, as shown in FIG. 3, the thrust member 3 biases the free end part of the plate-like member 30 to the left, so that the upper part of the plate-like member is bent to the left, as indicated by a phantom line. Then, molten resin is injected into the injection space 40. At this time, the molten resin flows equally into the right and left channels (in the directions of an arrow X and an arrow Y in the drawing). The resin pressures F1 and F2 against the plate-like member 30 are equal to each other. As a result, uneven resin filling and nonuniform thickness, which are endemic in the prior art approach, can be effectively reduced to a minimum.

After the resin injection ends, and the injected resin is cooled to allow it to solidify, the slide cores 31 and 32 are opened, and the shutter 22 is ejected from the mold by means of thrust pins 30a provided in the plate-like member 30.

Thus, the flows of the injected molten resin and the propagation of the pressure can be controlled in a manner such that the free end of the plate-like member 30 is moved by means of the thrust member 3. Accordingly, this embodiment not only can solve problems caused by the unwanted deformation of the plate-like member 30, but also reduce the time required for mold adjustment before mass production can be commenced.

In this embodiment, shutters are molded by way of trial while measuring the thickness t thereof. A suitable adjusting block 4 is selected on the basis of the trial molding to obtain a predetermined dimension of the mold. Following this, the mass production stage starts. A worker, even one not well skilled, can easily carry out the dimension-setting procedure.

While in the above-described embodiment one thrust member 3 is used, two or more thrust members 3 may be used. The thrust members 3 may be provided on both slide cores 31 and 32, or only on the slide core 31. Provision of the thrust members on both slide cores allows a minute adjustment in situations where, for instance, the gate is positioned at the top plate 27 but offset in the longitudinal direction of the shutter and the resin injection direction is lateral.

Modifications of the above-described embodiment will be described with reference to FIGS. 8 to 10. The description of the modifications will be given placing emphasis on the distinguishing portions.

In the molding apparatus shown in FIG. 8, the thrust member 3 is shaped like a U. The forward ends 3a and 3b of the legs of the thrust member 3 are extended into the injection space so as to thrust the free end of the plate-like member 30. Thus, the thrust member 3 is constructed so as to include the function of the protruding part 5 in FIG. 2.

In the molding apparatus shown in FIG. 9, two thrust members 3A and 3B are disposed within a large single depressed portion 6. Adjusting blocks 4 are respectively provided for those thrust members. The amounts of thrust of the forward ends 3a and 3b of the thrust members are adjusted by those blocks.

Figure 10:
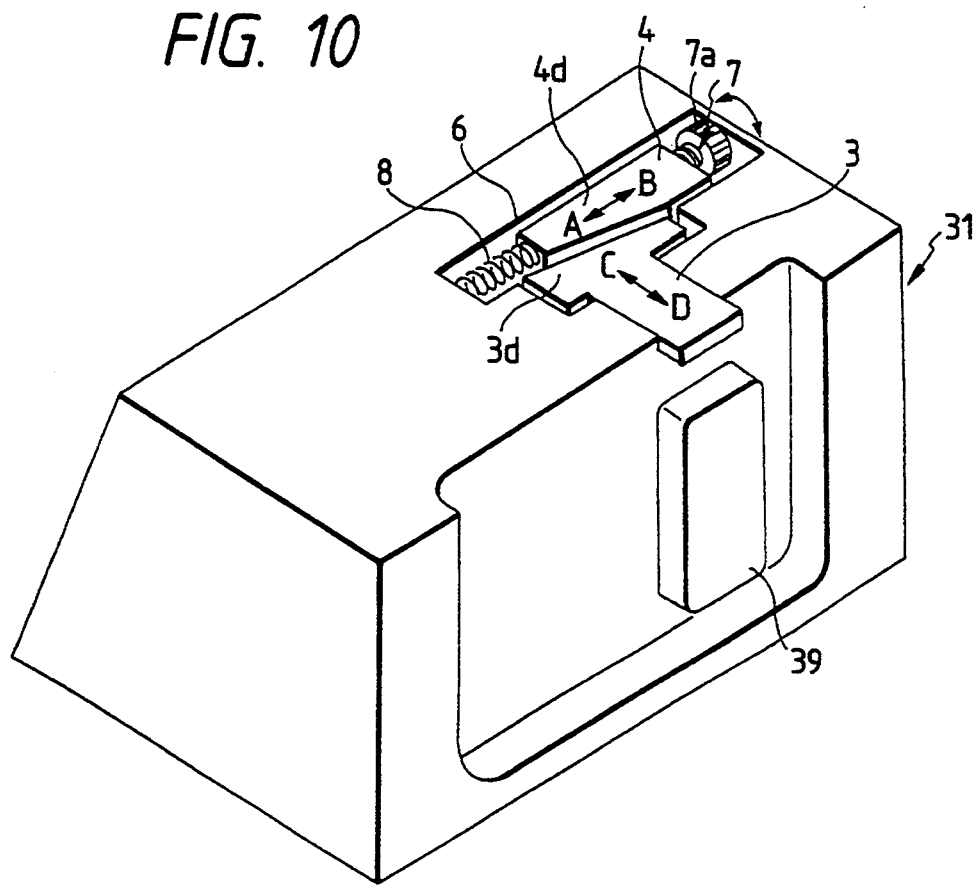
FIG. 10 is a perspective view showing a key portion of still another mold according to another embodiment of the invention.

In the molding apparatus shown in FIG. 10, the rear end face of the thrust member 3 is tapered to form a tapered face 3d. The face of the adjusting block 4, which is to come into contact with the tapered face 3d, is also tapered to form a tapered face 4d. The thrust member 3 is movably mounted so as to move toward and away from the plate-like member 30 (in the directions of arrows C and D). The adjusting block 4 is assembled so as to move parallel to the plate-like member 30 (in the directions of arrows A and B). The adjusting block 4 is constantly urged toward the side of the depressed portion 6 (in the direction of the arrow B) by means of a compression spring 8. An adjusting screw 7 is provided on the side of the adjusting block 4 opposite to the side thereof having the compression spring 8. Thus, an adjusting means for moving the thrust member 3 is formed of the adjusting block 4, the compression spring 8, and the adjusting screw 7. The adjusting block 4 is moved against the force of the compression spring 8 by turning the head 7a of the adjusting screw 7 in the direction of retracting the screw out of the block (in the direction of the arrow A). The same is moved, under the force of the compression spring 8, in the reverse direction (indicated by the arrow B) by turning the adjusting screw 7 in the direction of inserting the screw into the block.

In the molding apparatus thus constructed, the amount of adjustment of the thrust member 3 is determined by the amount of movement of the adjusting block 4 (movement in the direction of the arrow A or B) and the angle of the tapered face 4d. This implies that reducing the angle of the tapered face 4d provides a finer adjustment than the adjusting screw 7. Where movement for adjustment of the block in excess of that obtainable by adjusting the adjusting screw 7 is required, another block of a suitable size is inserted between the head 7a of the adjusting screw 7 and the side wall of the depressed portion 6.

In the construction shown in FIG. 10, the adjusting screw is used for moving the adjusting block 4 to adjust the amount of thrust of the thrust member 3. The thrust adjustment can be realized by any suitable means other than a screw so long as the amount of movement of the wedge-shaped adjusting block 4 can be properly adjusted with respect to the thrust member.

Several structures for moving the thrust member have been described above. Alternatively, the thrust quantity may be adjusted by selectively using a plurality of thrust members of different sizes.

The above-described preferred embodiments of the invention relate to the case of a 3.5-inch microfloppy disc cartridge. It is evident though that the injection mold of the invention can be applied to other molded products in which an injection space is formed using a relatively flexible plate-like member. Additionally, the invention can be applied to molding shutters for other types of disc cartridges.

As has been described above, a plate-like member with a free end defines an injection space, the plate-like member being defined by at least two opposed planar plates which are continuous, and the resin being injected from a region close to the free end of the plate-like member. Thrust means, which is movable in the thickness direction of the plate-like member, is provided close to the free end of the plate-like member. Prior to the injection of the resin, the amount of movement adjustment by the thrust means is adjusted to within a specific range as seen in the direction of the thickness of the plate-like member, on the basis of the position where the forward end of the thrust means comes into contact with the plate-like member.

According to the molding method of the present invention, and a molding apparatus based on the inventive molding method, in molding a thin plate-like product, the resin injection pressure can be controlled, and the amount of deflection of the thin plate-like member, which defines the injection space but which can easily be deflected under the injection pressure, can be controlled. Therefore, with the invention there is no need of a process to adjust the mold by cutting. The molding process can be shifted to the mass production stage extremely quickly. Moreover, no fatigue of the plate-like member is created, so that the service life of the mold can be extended. A plastic shutter for a disc cartridge, for example, which is produced by the inventive molding method and molding apparatus, is free from variations in the filling of the molten resin and in the thickness of the molded product. The molten resin can thus be more stably be cooled, providing a molded product with less variation of dimensions.

What is claimed is:

1. A method for molding a plastic shutter for a magnetic disk cartridge, comprising the steps of:
   (a) providing first and second core members defining therebetween a molding cavity, each of said first and second core members including raised portions for forming a window in said shutter, said raised portions being located opposite one another;
   (b) providing a plate member extending into said molding cavity and cooperating with said first and second core members to define an injection space having the shape of said shutter, said plate member having a free end in said molding cavity;
   (c) providing at least one thrust member extending into said molding cavity and contacting said free end of said plate member;

(d) adjusting an amount of protrusion of said thrust member into said molding cavity in a direction perpendicular to said plate member within a range of +40 μm to −20 μm relative to a position where a forward end of said thrust member contacts said plate member without exerting a thrust force on said plate member; and (e) injecting molten resin into said injection space to mold a plastic shutter.

2. The method of claim 1, further comprising the steps of:

repeating said steps (d) and (e) until a shutter is obtained having predetermined thicknesses of obverse and reverse plates thereof; and repeatedly molding plastic shutters without further adjustment of said amount of protrusion of said thrust member.

3. The method of claim 1, further comprising the step of providing a gap between said plate member and each of said raised portions.

4. The method of claim 3, wherein said gap has a width in a range of 3 to 15 μm.

5. The method of claim 1, wherein said gap has a width in a range of 5 to 8 μm.

6. The method of claim 1, wherein said step of adjusting said amount of protrusion comprises fitting at least one adjusting block having a predetermined thickness to the rear of said thrust means in a depression in one of said core members.

7. The method of claim 6, wherein said adjusting means comprises fitting a plurality of adjusting blocks having respective predetermined thicknesses to the rear of said thrust means in a depression in one of said core members.

8. The method of claim 1, wherein a plurality of said thrust members are provided.

9. The method of claim 8, wherein said step of adjusting comprises adjusting said thrust members separately and independently.

10. The method of claim 9, wherein said thrust members are adjusted in a direction perpendicular to said plate member in a range of +4 μm to −4 μm relative to said position where a forward end of said thrust members contacts said plate member without exerting a thrust force on said plate member.

11. The method of claim 1, wherein said thrust member comprises two forward end parts in contact with said plate member.

12. The method of claim 1, wherein a rear end part of said thrust member received in said depression is slanted, and wherein said adjusting means comprises a wedge block abutting said rear end part of said thrust member, and wherein said step of adjusting comprises moving said wedge block in a direction perpendicular to a direction of movement of said thrust member.

13. The method of claim 12, wherein said step of adjusting comprises turning a screw for moving said wedge block.

14. The method of claim 1, wherein said resin is injected through an injection gate disposed at a position opposed to an end surface of said free end of said plate member.

15. A mold for molding a shutter for a magnetic disc cartridge, comprising:

first and second core members defining therebetween a molding cavity, each of said first and second core members including raised portions for forming a window in said shutter, said raised portions being located opposite one another;

a plate member extending into said molding cavity and cooperating with said first and second core members to define an injection space having the shape of said shutter, said plate member having a free end in said molding cavity;

at least one thrust member extending into said molding cavity and contacting said free end of said plate member; and means for adjusting an amount of protrusion of said thrust member into said molding cavity in a direction perpendicular to said plate member in a range of +40 μm to −20 μm relative to a position where a forward end of said thrust member contacts said plate member without exerting a thrust force on said plate member.

16. The mold of claim 15, wherein a gap is provided between said plate member and each of said raised portions.

17. The mold of claim 16, wherein said gap has a width in a range of 3 to 15 μm.

18. The mold of claim 16, wherein said gap has a width in a range of 5 to 8 μm.

19. The mold of claim 15, wherein said adjusting means is received in a depression in one of said core members.

20. The mold of claim 19, wherein said adjusting means comprises at least one adjusting block having a predetermined thickness.

21. The mold of claim 19, wherein said adjusting means comprises a plurality of adjusting blocks having respective predetermined thicknesses.

22. The mold of claim 19, wherein a plurality of said thrust members are provided.

23. The mold of claim 22, wherein said thrust members are separately and independently movable.

24. The mold of claim 23, wherein said thrust members are adjustable in a direction perpendicular to said plate member in a range of +4 μm to −4 μm relative to said position where a forward end of said thrust members contacts said plate member without exerting a thrust force on said plate member.

25. The mold of claim 19, wherein said thrust member comprises two forward end parts in contact with said plate member.

26. The mold of claim 19, wherein a rear end part of said thrust member received in said depression is slanted, and wherein said adjusting means comprises a wedge block abutting said rear end part of said thrust member, said thrust member being adjusted by moving said wedge block in a direction perpendicular to a direction of movement of said thrust member.

27. The mold of claim 26, further comprising a screw for moving said wedge block.

28. The mold of claim 15, further comprising a fixed mold part and a movable mold part, said first and second core members comprising slide cores coupled to said movable mold, said first and second core members having slanted outer surfaces, and said fixed mold having extended portions having slanted surfaces receiving therebetween said slanted surfaces of said first and second core members.

29. The mold of claim 28, further comprising an injection gate formed in said fixed mold at a position opposed to an end surface of said free end of said plate member.

* * * * *